Feb. 23, 1937.  E. E. ECKARDT  2,071,821

PHOTOGRAPHIC IMAGE BEARER AND METHOD OF MAKING SAME

Filed Nov. 18, 1933

Inventor:
Emil Eduard Eckardt
by
Atty

Patented Feb. 23, 1937

2,071,821

UNITED STATES PATENT OFFICE 2,071,821

PHOTOGRAPHIC IMAGE BEARER AND METHOD OF MAKING SAME

Emil Eduard Eckardt, Dresden, Germany

Application November 18, 1933, Serial No. 698,671
In Germany April 18, 1931

21 Claims. (Cl. 95—88)

My invention relates to photographic image bearers, such as plates or films, and to a method of making and reproducing same.

It is an object of my invention to prepare a photographic image bearer in such manner that its reproduction is facilitated and the cost thereof is reduced. To this end I eliminate the necessity of using a separate screen by treating the light-sensitive silver-halide layer of the plate or film in such manner that the silver particles in the layer itself form a screen. This screen which will be referred to hereinafter as "natural screen" is adapted and intended to replace the screen separately produced according to one of the old methods hitherto used for this purpose.

Such a screen used according to one of the old methods is formed of lines which intersect at right angles, and this screen is placed between the original and a second plate on which the original is photographed. The necessity of making a second photograph increases the cost of the operation and moreover the image or picture on the second plate is not altogether satisfactory because the lines of the screen show in the picture, interfering with its contrasts and breaking up the picture by their regular strictly geometric arrangement.

The natural screen according to my invention, on the other hand, is of an irregular character. It may consist of continuous curves or of individual spots. A screen of this kind is preferable by far to a regular geometric screen of the old kind because it interferes far less with the contours of a photographic picture than the straight intersecting lines of the old screen. Being produced in the silver image of the layer itself the natural screen adapts itself to the various shades of the photographic image, as its properties are determined by the amount of blackened silver particles which are present in the individual portions of the image. The darker portions obviously contain more such particles than the lighter ones, and the lightest portions may even be free from all silver particles, i. e. may be pure white or absolutely transparent. The screen may not show in those portions of the image which are absolutely black or pure white but only in the shadings or half tones which are intermediate these extremes. While thus the natural screen according to my invention may disappear altogether not only in the darkest but also in the lightest portions of the image, in autotypes produced by the old methods the "artificial" screen shows throughout the image, disappearing only in the absolutely black portions but darkening the lighter and lightest portions which should be pure white and thereby interfering with the contrasts of the picture or reproduction.

The effect of photographs, and particularly of portraits, becomes more artistic by the natural screen, so that reproductions from such photographs, plates or films are not only more contrasted than those obtained by the old method, but bear a great resemblance to engravings.

My invention permits making negative or positive photographic pictures of any desired subjects (persons, articles, scenery, etc.) embodying the natural screen referred to. From the originals copies such as image reproductions, printed reproductions or the like can be produced by any well known methods of reproduction and printing.

It is known that by exposing a light-sensitive silver-halide layer and by developing the exposed layer, a silver image is produced which consists of blackened silver particles. A picture obtained in this manner if positive (known as a lantern slide) may be the final product, or a positive or negative picture may be the original for reproduction, such as phototype, plain printing, letterpress printing, copper-plate printing, color printing, etc.

In the reproduction of photographic pictures as heretofore performed it was possible only to obtain copies which substantially correspond to the photographic shades of the original, but this requires the separate screen referred to which is superimposed on the picture. This is undesirable for the reasons stated, and particularly if it is desired to obtain the effect of a line etching, for which normal photographic originals cannot be used.

This drawback is eliminated according to the present invention by forming the natural screen on the original. With an original of this kind I may obtain reproductions which resemble either a line-etching made by hand or a halftone reproduction. From a positive original having the natural screen in the silver image of its silver-halide layer, I may obtain printing plates for plain and copper-plate printing, offset printing and phototype, and from a negative original having the natural screen I may obtain printing plates for book and newspaper printing.

According to my invention the silver image (and the printing faces of the plates obtained from the image) is selectively influenced and varied, starting from the exposure of the silver-halide layer and during the individual stages of the method, so that the desired effect of the reproductions is obtained.

The exposure may be so regulated that the latent image obtained is most favorable for the object in view. The development of the latent image must be performed in such manner that the blackened silver particles which are available after the exposure, are properly produced and distributed. The same applies to the fixing, intensification, reduction, and covering (if any), of the layer.

The result is a dislocation and rearrangement of the blackened silver particles by which the particles are crowded nearer together in certain places while they are withdrawn from the regions in the vinicity of the points of local concentration. In this manner the natural screen is formed. The blackened silver particles combine into curved lines or individual spots of black which are bordered or surrounded by curves or areas of white.

In the drawing affixed to this specification and forming part thereof two kinds of natural screens are illustrated diagrammatically by way of example.

In the drawing

Fig. 1 illustrates a screen of the first-mentioned kind, with black curved lines, while

Figure 1:
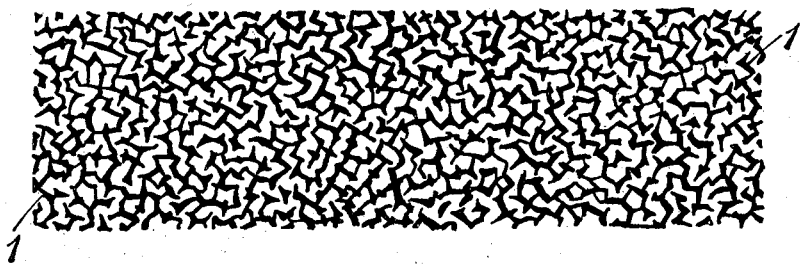
Figure 2:
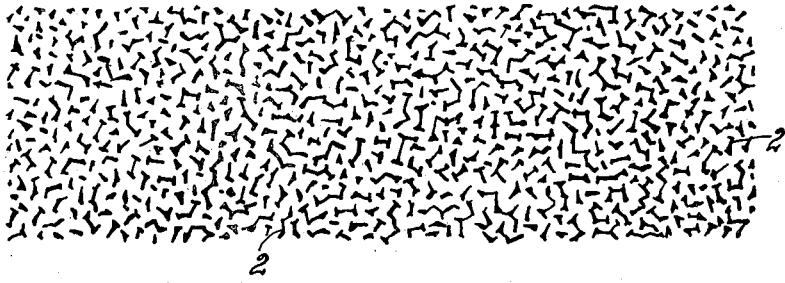
Fig. 2 illustrates a screen of the last-mentioned kind with black spots, both figures being magnified.

Referring to the drawing and first to Figs. 1 and 2, 1, 1 in Fig. 1 are the black curves or lines formed by the silver particles, with corresponding white lines or areas surrounding them, and 2, 2 in Fig. 2 are the black spots of silver particles described above. The plates were uniformly exposed to light for a short time.

The dislocation and re-arrangement of the silver particles and the variation or subdivision of the silver image produce a very plastic effect in negatives, positive copies, and lantern slides. The irregularity of the lines or spots of dislocated silver particles, with their mosaic-like subdivision, produces an artistic effect resembling that of an engraving, without in any way interfering with the outlines and the effect of the picture.

The variation of the silver image produced according to my invention is equivalent to the effect of a high-class screen. The term "screen" as applied to the rearrangement of the black silver particles in the layer by physical or chemical methods has been selected for the sake of simplicity, although this natural screen altogether differs from the geometric screens hitherto produced which are independent from the image proper. The necessity of photographing a geometric screen into the picture, and all interference with the silver image by this screen are obviously eliminated. The photographic shade of the picture is strictly conserved, as the screen is formed exclusively by a rearrangement of the silver particles present in the layer.

The formation of the natural screen in the silver-halide layer comprises two stages: The developing of an exposed layer and the softening or soaking of the layer to impart to it a jelly-like character which permits the blackened silver particles to move or "float" in the layer. The silver particles have a tendency to cluster as soon as they are free to move or float in the softened or soaked layer, and this tendency can be furthered by exerting on the particles physical, thermal or chemical action. As physical means I may use hot and cold liquids and particularly alternating baths, i. e. baths of water or other liquid having more or less widely different temperatures, in which the layers are alternately immersed. The higher the temperature gradients, the finer the screen. Such alternating baths may be applied before the development, before the fixation, and in particular after the application of the bath in which the screen is formed, i. e. in which the gelatine forming the layer is softened. The developer and the fixing bath themselves may form parts of an alternating bath, i. e., the developer or the fixing bath may be hot or cold, and the preceding or succeeding bath may be cold or hot. It has proved favorable in certain cases to first place the layer in water or oil of about 25° C. before developing the layer, or to first subject the layer to the action of water vapor (steam).

The finest screens are obtained by thermal action, the layer being heated in dry condition to about 50°, or more, before being developed, so that its water content is partly or completely expelled. A layer which has been subjected to this preliminary drying treatment, will stand baths, and more particularly developers, of rather high temperature, up to 50° C. and even above this temperature.

It has been found that the natural screen forms more readily in layers which are comparatively hard and will stand temperatures of the order of 36 to 38° C., and that screens formed in such harder layers are more contrasted than screens formed in layers which are so soft that they would melt and come off the glass or film when heated to such a high temperature range. Such soft layers however are very suitable for photographic reproduction, though not for printing. If reproduction by printing is desired, harder layers should be used.

Plates or films may be subjected to the preliminary drying treatment before being sold. Such plates or films, in addition to their other desirable properties, will stand tropical temperatures as they will hardly be exposed to temperatures of 50° C. or more even in the tropics.

As mentioned above, plates and films which have been dried by heating will withstand the action of hot developing baths. High temperature of the developer is desirable as the period of exposure may be shorter, and as the temperature gradients in the case of alternating baths may be much higher, resulting, as mentioned above, in finer screens. With the shorter exposure period the silver-halide layer to be developed becomes thinner and this is favorable for the formation of the screens because only superficial development is required. This mode of development is preferable because the contrast between the dark lines of the screen and the white intermediate areas is increased. With a concentrated and/or hot developer the developing period may be reduced to 30 seconds and less. Layers developed superficially have a more harmonious effect and are so thin and permeable to light that a successful exposure of the copy, for instance a metal printing plate to be etched, is guaranteed.

Preferably, in the first water bath applied to the layer after it has been developed or fixed, the layer is slightly contacted with the water in the bath repeatedly, say, six to ten times, until the layer has become mat like velvet. This deprives the layer of its water-repellent character, particularly against hot water, so that the subsequent baths become more efficient. A similar operation may be performed in the screen-forming bath, but only before the screen has formed.

Chemical action may be exerted on the layer by using acids or ammonia, for instance pure ammonia solution, or ethyl ether, or a mixture of ammonia and ether, say at the rate of 3 parts of ammonia to 1 part of ether, the mixture being hot or cold. The action is most favorable if a warm developer is followed by a cold bath of ammonia, ether, or a mixture of both. In a screen obtained by such chemical treatment, the silver particles do not break up the contours of the picture into serrations but conserve them almost in unchanged condition.

By these means a more or less contrasted coarse or fine screen can be obtained by the operator, as desired.

The various plates and films which are on the market behave differently when subjected to treatment according to my invention, as the softening capacity of their layers is determined by the age of the plates or films, by the degree of hardening, by the fineness of the gelatine grain and by the size of the silver particles.

In order to obtain a satisfactory screen, it is necessary to try out at which temperature of the baths the most favorable jelly-like condition of the layer is obtained, without the layer becoming detached from the support altogether.

The examples which will now be described, relate to fresh plates, or to plates which have not been stored for a long time.

Referring again to Figs. 1 and 2, the density and blackness of the curves 1 or spots 2 are uniform because the plates were exposed to light without a picture being projected thereon. In the screen shown in Fig. 2 the formation of the screen was prematurely interrupted. The curves or lines in Fig. 1 are all connected but subjected to a continuous change of direction.

The simplest method of producing a natural screen is the following:—

An exposed and developed layer is placed in a bath of water having a temperature of say 30 to 36° C., for a short time, say one or two minutes, until the silver particles have clustered. Instead of the water bath, I may apply a bath of oil, such as olive oil, sun flower oil or the like, or I may subject the layer to the action of water vapor. A plate or film which has been treated in conformity with this simple method, may serve for use as a lantern slide, or for photo copies and prints on paper, but as a rule the screen is not yet satisfactory. It is not sufficiently contrasted because the silver particles have not yet all clustered in the dark portions, so that the dark portions are not altogether black and the white portions are not pure white because silver particles are still present in them. Besides the screen is coarse because, if proceeding as described, the clustering of the silver particles occurs very slowly so that the individual clusters are too large and not broken up as finely as required.

The various treatments which have been described above, such as alternating baths and the like, principally serve for obtaining a more thorough clustering of the particles, so that the lines of the screen become more opaque and the intermediate areas become more transparent and for reducing the width of the lines until the natural screen becomes as fine as the usual artificial screen. As a rule the treatments in view at the same time improve the clustering and reduce the width of the lines. It is important that the lines should be altogether black and the intermediate areas altogether transparent because, if this condition is fulfilled, the printing plates obtained from the screen originals can be deep-etched without important parts of the pictures being destroyed.

As mentioned above the screen may be improved by single or alternating baths with or without chemicals, heating of the layer before developing it, or by superficial development.

In some kinds of plates the formation of the natural screen is favored by previously ageing the developer, i. e. allowing it to stand for a long time, or heating it to the boiling point, or mixing a developer which has been thus heated, with some unheated developer. Preferably the developer is heated to the boiling point in a dish of enamelled steel which is held at an angle above a spirit or gas flame, the residual developer adhering to the raised portion of the dish being evaporated to dryness and the boiling developer washing over the dry portion and absorbing the dried developer. The developer is now cooled and used at a temperature of about 22 to 26° C. This treatment yields very clearly defined screens of any desired fineness.

My invention further provides the application of salts and salt preparations to the fixing salt. Such salts may be sodium chloride or ammonium chloride. For instance one part ammonium chloride may be mixed with four parts sodium hyposulphite and twenty parts water. Treatment with such salts favors and accelerates the subsequent formation of the screen, and prints taken from the plates or films thus treated are more harmonious and possess more impressive art-printing effect.

While the treatments which have been described above, relate to the clustering of the particles to form the screen and not, or not principally, to the improvement of the screen itself, i. e., to the production of the maximum opacity of its lines, and the maximum transparency of its intermediate areas, there will now be described treatments by which the contrast of the black lines or spots and the white intermediate areas is increased by means of reducing and intensifying agents. It will be understood that these agents are used only to produce or improve the screen, not the picture itself. Such subsequent treatments are applied after the application of the screen-forming bath and the agents only reduce the intermediate areas and intensify only the lines of rearranged silver particles. This subsequent treatment is not exactly the same as the usual intensification or reduction of a normal photographic image in which the silver particles do not cluster to form black and opaque lines or spots, with white and transparent areas surrounding them, as described, but are distributed more or less uniformly and are involved as uniformly in the intensification or reduction. The subsequent treatment according to the invention renders the black portions more opaque, and the transparent ones more transparent.

Thus, after the layer has been treated in the manner described, but as a rule before intensification (if any) is exerted, the layer is placed in a bath of potassium ferrocyanide and sodium thiosulphate. The composition of this bath may be as follows: One part of a solution of five grams potassium ferrocyanide in 100 grams water and ten parts of a solution of five grams sodium thiosulphate in 100 grams water.

This treatment not only renders the intermediate areas more transparent but also hardens the layer for the repeated application of screen-forming baths for refining the screen.

The layer may also be treated for a short period with a mercury or other intensifier. I prefer the treatment with the solution of potassium ferrocyanide as described, and with a mercury intensifier, for instance a solution of 20 grams mercuric chloride in 100 grams water. The intensifier is applied for about two fifths of a second and the ferrocyanide solution is also applied for a short period only. Obviously the layer must be thoroughly washed after every bath.

In this treatment the opposite influences of the two agents are utilized to the best advantage. The ferrocyanide, before attacking and reducing the dark portions of the screen, renders more transparent the white intermediate areas, while the mercury intensifier first intensifies those portions of the screen which are rich in silver particles, and thereupon the less rich ones. The duration of the treatment in the baths must be so short that the dark portions of the screen are not yet reduced and its light portions not yet intensified. This increases the contrast between the dark and light portions of the screen. In order to intensify only the dark portions of the screen without influencing the white intermediate areas, it is necessary that the intensifier should be applied only during fractions of a second, and that the layer be washed immediately, as otherwise the intermediate areas would become less transparent. Intensification may be repeated as often as required, until the dark portions of the screen are altogether black while the intermediate areas remain altogether transparent.

If intense light is used for the reproduction of the originals, particularly with reproduction plates, it is necessary that the dark portions of the screen should possess a higher degree of opacity than that which is imparted to them by the aforesaid treatments. This is effected by treatment in a bath of sodium sulphide following the mercury intensification. By these means the dark portions of the screen become almost impermeable to light.

If metal printing plates shall be obtained from the originals and etched, a uranium intensifier may be preferable to the mercury intensifier. A suitable uranium intensifier may be prepared as follows:

*Solution I.*—500 ccms. water, 5 grams uranium nitrate and 25 ccms. glacial acetic acid.

*Solution II.*—500 ccms. water, 5 grams potassium ferricyanide and 25 ccms. glacial acetic acid.

Equal volumes of the two solutions are mixed. Owing to the uniform distribution of the silver particles in the layer of the plate, the uranium intensifier as a rule reddens all parts of a normal plate, but in a plate having a natural screen it only reddens the dark portions where the silver particles have clustered, because the white portions are almost free from silver particles. As all chromates are highly sensitive to red and yellow, the chromate layer on the metal printing plates holds not only spots which are deep black but also spots which are only grey and otherwise could not be etched on account of insufficient blackening.

Two more examples for treatments which I have found to be particularly suitable, will now be described:

I.—A plate is dried in hot air at a temperature which is as high as possible without damaging the layer, say 50° C. or more, as described. The plate may be dried before or after the exposure. The period of exposure is reduced to about one half of the normal period. If the operator knows what kind of reproduction is required, he will consider this in the exposure. Thus the exposure should be shorter for reproduction in the manner of line etching than for half-tone reproduction. The plate is now developed with a rapid developer, such as those sold under the trade-names of Edinol, Metol, Rodinal or the like. If Rodinal is used, the solution should contain 5 to 30 parts of the developer and 100 parts of water, and should have a temperature of 26 to 32° C. The development is very rapid. The fixing bath is prepared as usual, for instance from 200 grams sodium thiosulfate and 50 grams ammonium chloride dissolved in 1000 ccms. water at room temperature. Now the screen-forming bath is applied, this being a hot-water bath whose temperature should not exceed 44° C. and which may be allowed to act on the plate for about three minutes. This bath is followed by a cold-water bath having a temperature of 8 to 10° C., the two baths being applied alternately.

The plate may now be treated with a bath of 5 grams potassium ferrocyanide in 100 ccms. water, which is mixed with 10 parts of a fixing bath containing 25 grams sodium thiosulfate in 500 ccms. water.

The plate may also be treated with a solution of 10 grams mercury chloride in 500 ccms. water and with a solution of 10 grams potassium bromide in 500 ccms. water. The baths may also be applied in reversed sequence.

II—The plate is not dried but is developed at room temperature in a developer containing 7.5 to 30 parts Rodinal developer in 100 parts of water. The duration of the developing should be as short as possible, say one to three minutes. The fixing bath contains 20 grams sodium thiosulfate and 10 grams ammonium chloride in 100 ccms. water. The screen-forming bath is now applied, being a hot-water bath of 28 to 44° C., whereupon the plate is placed for a short time in a solution of 10 grams mercury chloride and 5 grams sodium thiosulfate in 100 ccms. water. The plate is now washed in cold water and, if required, intensified in a solution of 10 grams mercury chloride in 500 ccms. cool water. The plate remains in the intensifier, which is agitated, for about three minutes and is then blackened by means of highly concentrated, say a 35% ammonia solution at a temperature not exceeding 35° C., or by means of a solution of 5 grams sodium thiosulfate in 100 ccms. water.

The so-called reproduction plates (photomechanical or phototechnical plates) which have a very thin layer and low light-sensitivity require special treatment. When making electrotypes, the original negative or positive pictures are photographed on such plates. For forming the screen in such plates, it is not necessary to use aged developers or to heat the developer to boiling temperature, as above described, but they may be developed immediately in a rapid developer, say highly concentrated Rodinal, containing 20 to 40 ccms. Rodinal developer and 60 to 80 ccms. water. The developer is heated to say 22° C., but this is not the limit. The developer may be heated to temperatures at which developer stains will not occur. The hotter the developer, the finer the screen. Therefore, if it is desired to obtain a line-etching effect in the reproductions, the developer should be comparatively cool, say 18° C. The development occurs like a flash, and the plate is apparently black throughout. However, viewed in daylight in the fixing bath, it must show the picture in white. After the plate has been developed, a cold-water bath of 8 to 10° C. is applied which is contacted with the plate six to ten times in the manner described above.

As rapid treatment is often important for such plates, the fixing bath is preferably prepared with a rapid fixing solution containing for instance 20 to 40 grams sodium thiosulfate and 5 grams ammonium chloride in 100 grams water, and the fixing bath is applied in warm condition for instance at 22° C. After fixation a hot-water bath is applied which is as hot as the layer can stand it without becoming detached. The temperature limits may be rather narrow for the usual kinds of hot-water bath. Thus for the usual kinds of plates it has been found that the temperature of the bath should be between 30 and 31° C. and on no account above 32° C. The water in the hot bath is contacted with the plate two or three times as described, but only before the screen has formed and until the layer has become mat like velvet. The duration of the application of the hot-water bath is 10 to 20 seconds and it is followed by a cold-water bath which is applied until the layer has cooled down to the temperature of the bath. Its duration may for instance be five seconds. The treatment with the alternating baths is continued until the screen is black throughout the intermediate areas being altogether transparent, care being taken to prevent detaching of the layer. A longer application of the alternating baths renders the screen coarser. If there are still too many grey shades in the plate for etching, the plate is placed in a strong solution of potassium ferrocyanide for one or two seconds, the solution containing for instance 10 to 15 grams ferrocyanide and 4 grams thiosulfate per 100 ccms. water. The reduced plate is placed in a cold-water bath, and this treatment is repeated as often as required.

Old and dry plates may also be subjected to the treatment for forming a screen therein. If a plate is already provided with a natural screen, this screen becomes finer by the repeated breaking-up of its structure. Old plates, developed plates, fixed and dry plates are placed in water of about 25° C., preferably after having been previously heated to about 50° C., as described.

In autotypes produced in the old way with separate screens the raised portions of the etched printing plates are protected from the attack of the etching liquid by a coating, in order to obtain more plastic reproductions. The natural screening according to this invention permits a more simple and more efficient operation by applying to the screened layer itself black color with a colored pencil. In this manner the plate can be retouched by means of black lines and areas while in the autotypes produced with separate screens the covering could only be altered in spots.

By engraving certain lines of the image on the layer of a plate having a natural screen, down to the support (glass) of the layer, (this being old in the art) the effect becomes more harmonious than in layers formed with a separate screen, and the reproduction gives the impression of an engraving. The treatment is facilitated by coloring the plate red or yellow after the screen has been formed, as this presents the image more distinctly to the operator's eye. Alterations of the printing plate are not required with this treatment of the original.

The printing plates, for instance metal plates having a chromate layer, zinc plates, or the like, are exposed directly through the screen of any silver-halide layer, and etched. The contrast between the dark lines of the screen and the transparent intermediate areas determines the intensity of the etching which can be performed, and it is possible to perform the etching in a single operation which was heretofore practicable only at the expense of the contrasts. Etching may be extended much more deeply than was heretofore possible even with repeated etching, for instance with strong acid such as is used for line etching. A suitable acid may contain 15 ccms. concentrated nitric acid in 100 ccms. water. The contrasts may be so strong that upon etching the highest lights or the lighter shades disappear altogether. The highest lights are the finest metal cones which remain over. If they break down, this only increases the plastic effect of the reproduction, as it occurs only in the lighest portions of the picture. In this manner, the original is reproduced with all its shades, or the reproduction obtained is modified until its effect is substantially equal to that of a line etching made by hand. This variety of reproductions may be made selectively from one original.

If, for instance, it is desired that the reproduction should render the effect of a line etching, the exposure should be shorter than normal so that the latent silver image becomes rich in contrasts, with the half tones comparatively undeveloped and the contours of the image standing out distinctly. For the same reason the developing period should be shortened. The screen in the negative, however, must not show in these portions of the copy or print which are either absolutely black or pure white but only in the intermediate shadings or half tones. The lightest portions of the copy or print which correspond to the absolutely black portions of the negative, should be pure white, and the darkest portions which correspond to the pure white portions of the negative, should be absolutely black, both without any trace of the screen. The etching should be so intense that not only the highest lights are removed altogether but that any spots of the screen which are still present in the lighter shades, disappear altogether, so that only the contours of the image remain as the printing surface. This may be effected, for instance, by using a strong acid for etching. Obviously, in performing the less important stages of the treatment, such as fixing, intensifying, reducing, covering, etc., the operator should always bear in mind that a strong contrast is aimed at.

If, on the other hand, a half-tone reproduction is desired, the operator should perform the treatment so as to obtain a less strong contrast, i. e., the sensitive layer should be overexposed and developed for a longer period, the formation of the screen should be more effective, and the etching less intense.

The reproductions or prints from etched metal plates which have been obtained from an original with a natural screen, can thus be made more artistic and more similar to engravings, but first and foremost with more intense contrasts. Not only normal printing paper of various kinds can be printed with such plates, but also other materials such as rough paper, cardboard, linen, cloth, silk and other textile materials, wood, cellulose, celluloid, artificial resins and the like, glass, porcelain, fayence, stoneware and other ceramic materials, which was heretofore possible only with expensive manual work, such as drawing, engraving, etc.

A particular improvement achieved by my invention is the possibility of directly printing photographic layers. This has already been attempted but proved an absolute failure. I have found, however, that by operating with a natural screen of the kind described, and by using the photographic layers themselves as printing plates, very good prints are obtained. The same applies to galvanoplastic products which can be made directly from such photographic layers.

The new method which brings forth the "natural screen" is superior to the old methods not only in the printing with electrotypes and in book printing, but also in plain, offset, copperplate and phototype printing. In particular in the four last-mentioned printing processes all that is required is to make a lantern-slide copy from a negative provided with the natural screen, without repeating the formation of the screen in the lantern-slide copy. The screened originals may be plates or films, and they may be photographed on plates or films, as desired.

It has already been mentioned that my method is advantageous if applied to plain printing. It must also be mentioned that I can apply it to lithography and related arts. From the layer with the natural screen, I obtain a phototype layer of gelatine on stone, zinc, copper, or the like, and can make double tone reproductions from this gelatine layer.

The new method is also particularly important for the printing of bank notes and photostat copies of documents or the like. As the natural screen never forms twice in exactly the same manner the new method provides an infallible means for ascertaining whether a bank note is genuine, i. e. was made from the original and from the type of a given series. Not only the arrangement and clustering of the silver particles will never repeat itself, but it is also very difficult to exactly imitate the etching as it is found in a given plate.

The new method may be applied to letter-press as well as to copper-plate printing. In letter-press printing more copies are obtained from a given type than in copper-plate printing which was heretofore exclusively applied to the printing of bank-notes, because letter-press printing requires much higher pressure than copper-plate printing, so that the life of the type is shortened.

The formation of the screen and/or the etching may be so performed that the characteristic features of the screen are visible to the naked eye on the reproduction.

My invention further relates to the image bearer itself, or to its silver-halide layer; the silver-halide layer must be selected in conformity with the desired character of the natural screen. As mentioned, the layer should be harder for reproduction by printing, and softer for photographs. On the one hand, it must readily be transformed into the jelly-like condition required for facilitating the movement and clustering of the silver particles while on the other hand it must not melt completely. It has already been mentioned above that the silver particles should float in the layer.

To this end the silver-halide layer is made of soft gelatine or mixed with a small percentage of a hardener. Such hardeners are dispersed substances which solidify the gelatine, for instance starch, chalk and the like. Preferably the hardener should be made of a material which is as transparent, as possible, or, in the case of a material which is not light-permeable, such as chalk, it should be dispersed so finely as not to interfere with the transparency of the layer. A suitable hardener may contain equal parts of gelatine and starch, for instance rice starch. The object of the hardener is to enable the layer to stand a hot-water bath of the temperatures indicated above without being dissolved, while on the other hand the layer must not be rendered so consistent by the action of the hardener that it interferes to any appreciable extent with the free movement of the particles.

Soft gelatine is preferable not only because it facilitates the free movement of the silver particles, as described, but also because it will assume the jelly-like condition permitting the formation of the screen at low temperature. Therefore, with a layer of soft gelatine, the screen-forming baths may be comparatively cool and the proper temperature of the bath is more easily ascertained.

It has been mentioned above that the layer may be dried by heating to about 50° C. before being developed, in order to partly or completely expel its water, and that plates may be marketed for the tropics in dried condition. This feature is of general importance.

Superficial development has already been referred to, and its advantages have been explained. Another advantage of a superficial development is that the layer with the screen is supported on a resilient stratum, i. e., the undeveloped portion of the layer.

Such strata or intermediate layers may also be inserted between the layer carrying the screen and its support, i. e., the glass backing of a plate, or the celluloid backing of a film.

Figure 3:
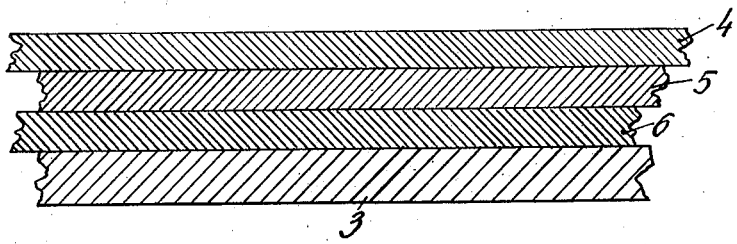
Fig. 3 is a magnified cross section of an image bearer having two intermediate layers between the halide layer and the support of the layer, as will be described more in detail below.

Referring to Fig. 3, the plate or film here shown has two intermediate layers, 3 being the glass or celluloid backing, as the case may be, 4 being the layer in which the screen is formed, and 5 and 6 being two intermediate layers which are interposed between the screen layer and the backing.

Any number of intermediate layers or strata may obviously be provided. The principal object of the intermediate layer or layers is to provide a resilient support for the developed silver-halide layer 4, as the intermediate layer remains resilient notwithstanding the exposure and development of the silver-halide layer. The intermediate layer may however also be utilized for influencing the treatment of the silver-halide layer. Thus some developer or some fixing salt may be admixed to the intermediate layer, or, if more than one intermediate layer is provided, one of the agents may be admixed to one, and the other agent to the other intermediate layer. In this manner the developing and/or fixing of the silver-halide layer is greatly accelerated. Substances such as ammonia, ether or the like, or a mixture thereof, as described above, may also be admixed to the intermediate layer or layers.

Instead of chemically active substances I may admix to the intermediate layer or layers hardening agents as described, for instance starch. An intermediate layer in which the gelatine is bound by a dispersed hardener, permits reducing the silver-halide layer to a softer condition than would be practicable without the intermediate layer, because the silver-halide layer, if softened to a condition in which it would come off a glass or celluloid backing, will still stick to the intermediate layer which, being hardened, retains the silver-halide layer.

If more than one intermediate layer is provided, as shown in Fig. 3, the outer intermediate layer 5 may contain an admixture of a developer, while the inner intermediate layer 6 may contain an admixture of fixing salt. The layers may be hardened to different degrees of hardness, the outer layer 5 with the developer admixed thereto, being hardened to a lesser degree than the inner layer 6, with the fixing salt admixed thereto. In this manner the outer layer 5 becomes soft first and sets free the developer admixed to it before the inner layer 6 is softened in its turn and liberates the fixing salt. In other words, the hardness of the intermediate layers should increase in the direction from the silver-halide layer 4 toward the support or backing 3.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. A method of producing layers with metal images from light-sensitive metal halide layers comprising softening of exposed and developed layers to a jelly-like consistency and carrying the softening process on without dissolution of the emulsion until the metal image in the layer while still in gelatinous state skeletonizes by the metal particles cohering to form irregular or curved lines which contrast to a new bright background between the said lines, thus imparting to a photograph the character of an engraving or an etching and saving the need of a separate screen when the said layer is to be used for making therefrom printing surfaces for mechanically printed reproductions.

2. In the method as specified in claim 1 softening the layer by treating it in a hot-water bath.

3. In the method as specified in claim 1 subjecting the layer while in its softened condition to a variation of temperature, by immersing it alternately in liquid baths having substantially different temperatures.

4. In the method as specified in claim 1 intensifying the contrast between the irregular lines and the new bright background.

5. The method set forth in claim 1, wherein the contrast between the irregular lines and the background is increased by intensifying the black skeleton.

6. The method set forth in claim 1, wherein the contrast between the irregular lines and the background is increased by reducing the said background with a photographic reducing agent.

7. In the method as specified in claim 1 developing only a thin superficial portion of the layer.

8. In the method as specified in claim 1 exposing a light-sensitive metal halide layer and developing it in a hot developer before softening the same.

9. In the method as specified in claim 1 exposing a light-sensitive metal halide layer, developing it and fixing said layer in a hot fixing bath before softening the same.

10. The method set forth in claim 1, wherein the skeletonized layer is treated with a bath containing potassium ferrocyanide and sodium thiosulfate in order to clear up the said background.

11. In the method set forth in claim 1, intensifying the contrast betwen the irregular lines and the background of the skeletonized layer formed as described by treating the layer in a mercury intensifier bath.

12. The method set forth in claim 1, wherein the skeletonized layer is subjected to ammonia for a sufficient length of time to insure preservation of the image contours and counteract any tendency for the contours to break up into serrations.

13. The method set forth in claim 1, wherein the skeletonized layer after development is subjected to ether for a sufficient length of time to insure preservation of the image contours and counteract any tendency for the contours to break up into serrations.

14. The method set forth in claim 1, wherein the skeletonized layer is subjected to repeated alternate treatments in a reducing bath and in an intensifying bath.

15. The method set forth in claim 1 wherein the skeletonized layer is subjected to a mercury intensifier for a brief length of time, and is subsequently treated with sodium sulfide.

16. The method set forth in claim 1 wherein the skeletonized layer is subjected to intensification in a uranium intensifying bath.

17. In the method as specified in claim 1 allowing the skeletonized layer to dry and coating it with lacquer.

18. Method of producing layers with metal images from light-sensitive metal halide layers carried on a support, comprising softening the exposed and developed layers to a jelly-like consistency and carrying out the softening process without dissolution of the emulsion until the metal image in the layer while still in gelatinous state skeletonizes by the particles cohering to form irregular or curved lines which contrast with a new bright background between said lines, allowing the skeletonized layer thus formed to dry, and etching the lines of the image down to the support.

19. In the method of claim 18, coloring said skeletonized layer, prior to the etching step, with a non-actinic color, whereby the image shows up more distinctly.

20. A photographic plate characterized by bearing a pictorial image composed of metal particles arranged in minute, separated, dark lines running at all angles with respect to each other, the particles cohering together in the lines, the lines being most numerous in dark areas of the picture, and the spaces between the lines being substantially clear and free from metal particles, whereby the plate is capable of direct reproduction by photo-mechanical methods.

21. Method of processing a photographic plate, film and the like of the type containing metal halide particles in a gelatinous carrying layer and exposed to a pictorial image, in order to secure a finished plate, film and the like capable of direct reproduction by photo-mechanical methods, which comprises the steps developing the exposed plate, film and the like and softening the gelatine to a jelly-like consistency without dissolution of the gelatine layer, until the image while still in gelatinous state skeletonizes by the particles cohering to form small, dark irregular or curved lines with the spaces between the lines being substantially clear.

EMIL EDUARD ECKARDT.